United States Patent [19]

Loncaric

[11] 3,870,350

[45] Mar. 11, 1975

[54] CRACK ARRESTER SYSTEM
[75] Inventor: Rado G. Loncaric, Dallas, Tex.
[73] Assignee: Atlantic Richfield Company, Los Angeles, Calif.
[22] Filed: Apr. 15, 1974
[21] Appl. No.: 461,018

[52] U.S. Cl.................... 285/286, 29/417, 29/477, 138/155, 285/422
[51] Int. Cl............................................ F16l 13/02
[58] Field of Search...... 285/286, 114, 422; 29/417, 29/477, DIG. 17; 138/155, 177, 178

[56] References Cited
UNITED STATES PATENTS
3,096,105  7/1963  Risley ................................ 285/286
3,698,746  10/1972  Loncaric............................ 285/286

Primary Examiner—H. Hampton Hunter
Attorney, Agent, or Firm—M. David Folzenlogen

[57] ABSTRACT

A crack arrester system and a pipeline containing at least one of the same wherein the crack arrester system is comprised of at least three zones with the intermediate or middle zone being significantly less resistant to crack propagation than the two outer end zones. In much preferred embodiments, the two end zones of the arrester have a resistance to crack propagation higher than the pipe in the pipeline. The preferred end zones may be zones of increased toughness or reduced hoop stress, or both.

29 Claims, 4 Drawing Figures

CRACK ARRESTER SYSTEM

BACKGROUND OF THE INVENTION

The present invention relates to a system for lessening or stopping longitudinal propagation of a crack in a pipeline made of cylindrical tubular pipe sections joined in an end-to-end fashion usually by welding. More particularly, at points in the pipeline the crack arresting system changes the crack propagation characteristics of portions of the pipeline thereby creating a shock or enhancing rupture of a brittle intermediate section and decompression of the internal pressure in the pipeline to a safer level. The system is particularly useful for cold temperatures such as occur in Arctic regions and for pipelines carrying fluids, such as natural gas or liquids containing highly volatile normally gaseous components, which do not decompress fast enough to prevent longitudinal fracture or crack propagation.

It is a known fact that various events can initiate a fracture or crack in an operating pipeline. If the rate of release of pressure in the fluid in the pipeline is slower than the speed at which a crack at a pressure in the pipeline will propagate, the crack will propagate in both directions away from the originating point. It has been found that such propagation usually occurs at the tip of the crack at a longitudinal direction along the top of the pipeline. The crack may travel for long distances.

Various types of crack arresters have been proposed, such as for example, those described in U.S. Pat. Nos. 3,096,105 and 3,698,746. But much has since been learned about the complexity of fracture propagation. Fracture propagation depends on many factors, such as for example, pipeline design, the pipe size and properties, the depth of burial and the properties of the backfill, the working pressure and properties of the fluid in the pipeline, and temperature. Inline monolithic members of opposite or angular fiber pattern than the pipe, such as those described in the aforementioned patents, are not by themselves likely to stop propagation of a fracture. Moreover, as described in U.S. Pat. No. 3,096,105, thickening a monolithic member under certain conditions could actually weaken it because thickening an already properly designed metallic section may aggrevate tri-axial stress problems which favor fracture propagation. A thickened wall is also likely to be nonuniform and contain flaws, like grain coursing. By way of illustration, in gas pipeline crack propagating experiments, a flange-like structure around the pipe which was approximately six inches wide and eight inches thick split and had little noticeable effect on propagation of the crack.

It is quite important, therefore, that some better system be provided for stopping excessive propagation of a crack.

SUMMARY OF THE INVENTION

According to this invention there is provided a pipeline crack or fracture arrester system wherein the system promotes occurrences which tend to coact ahead or near the point of crack propagation to stop a self-propagating fracture running along the pipeline. In much preferred embodiments, the system promotes three occurrences.

Briefly, the crack arrester system is comprised of at least three inline zones. The first and third zones are higher in resistance to crack propagation than a weak or less resistant middle or second zone. In much preferred embodiments of this invention, the first and third zones also have a resistance to crack propagation higher than the pipe in the pipeline on either side of the crack arrester system. A zone that is more resistant to crack propagation than another zone will slow the rate of crack propagation when the crack propagates from the less resistant zone into the stronger zone. The slower crack propagation rate may be due to increased toughness or internal energy in the higher resistant zone at the working temperatures, or due to a decrease in effective hoop or distortion in higher resistant zone, or a combination of the two.

The weaker or less resistant middle or second zone of crack arrester system is sufficiently strong to resist original fracture initiation and withstand the pipeline working hoop stress; but relative to the resistance of the higher resistant zones, or the pipe on either side of the crack arrester system, or both, the second zone is lower in resistance and is intentionally weak enough to promote or allow fracture propagation both longitudinally and circumferentially. This intentionally weak second zone has a brittleness at the operating temperature of the pipeline, which brittleness, when combined with the increased resistance of the first and third zones, will promote fragmentation, that is, crack propagation in multiple directions.

Briefly and nontechnically, the crack arrester system acts in the following manner. The bulk of the pipeline is selected and designed to prevent brittle fracture. It, therefore, has a selected resistance and toughness and is operated below its yield point, usually below seventy-two percent of its yield point. If, despite safety precautions, a self-propagating fracture does occur, the crack usually propagates rapidly along the top portion of the pipeline. The pipeline tends to distort progressively ahead of the crack, for example, a couple of pipe diameters. In this invention, the distortion pattern moving ahead of the crack will encounter zones of different crack propagation resistance. In a very well designed pipeline, the distortion pattern may pass from the higher resistant pipe or zones into a weak intermediate zone, and if it does not rupture the weak intermediate zone, it will thence pass from the weak zone back into the higher resistant zone or pipe. In much preferred embodiments of this invention, the distortion pattern will first encounter a zone higher in resistance than the pipe, then the intermediate weak zone, and then a higher resistant zone, if the weak zone has not already ruptured. When the distortion pattern hits a zone of significantly different characteristics, especially a higher resistant zone, it creates a strain wave. This strains the less resistant weak zone because the series of events occur quickly and create a shock tending to lift or buckle the pipeline at that point. At this time, the less resistant weak zone may rupture radially dumping the internal pressure of the pipeline. If this shock is not sufficient to rupture the less resistant weaker zone, the crack following the distortion pattern propagates into the weak zone, passes from the first zone, that is, the tougher pipe, or more preferably, a specially prepared highly resistant zone, into the weak second zone, and divides its propagating energy into several directions either rupturing the less resistant weak zone and dumping the internal fracture propagating pressure within the second zone or tending to allow the decompression wave to catch up. In the much preferred embodiments, the rate of crack propagation is first slowed entering a specially prepared zone higher in resistance to crack propagation than the pipe and then the crack enters the weaker intermediate zone. If the distortion pattern and possibly the crack pass through the less resistant weaker zone, they will encounter a tougher third zone, that is, the higher resistant pipe or more preferably, a specially prepared highly resistant zone, creating further strain if the less resistant weak zone has not previously ruptured and previously dumped the internal crack propagating pressure at that point. If the less resistant weaker zone has already ruptured, the tougher third zone prevents reinitiation of a crack.

Preferably, as an added feature, the three zones will be separated from or joined to each other and the adjacent pipe sections by circumferential, less tough welds.

As an added safety precaution to prevent reinitiation of a crack due to the whip created by escaping fluid, appropriately located pipeline anchors (not shown) may be used.

If desired, the crack arrester system may be made up of a series of more resistant zones followed by weaker zones ending finally in a more resistant zone.

Accordingly, this invention relates to a pipeline formed from a plurality of sections of pipe and provides a crack arrester system comprised of at least three zones fixed in open inline communication in the pipeline at at least one intermediate point somewhere between the ends of the pipeline.

The crack arrester system is useful in all types of pipelines including those carrying liquids, particularly where the liquids transmit a decompression wave at rates below the rate of travel of a fracture in the pipeline. This invention is particularly useful in all pipelines which carry a compressed gas, particularly natural gas, since this type of fluid can transmit the decompression wave at rates substantially below the rate of travel of the crack and are therefore much more susceptible to self-propagating fracturing.

Accordingly, it is an object of this invention to provide a new and improved crack arrester system for pipelines. It is another object of this invention to provide a new and improved pipeline which will stop a self-propagating fracture once initiated. It is another object to provide a new and improved apparatus which will stop the propagation of a crack in a pipeline, particularly in a pipeline carrying a gas under pressure. It is another object to provide a new and improved pipeline, particularly a natural gas pipeline, capable of extinguishing fractures which would otherwise be self-propagating along a substantial portion of the length of that pipeline.

Other aspects, objects, and advantages of this invention will be apparant to those skilled in the art from this disclosure and the appended claims.

DETAILED DESCRIPTION OF THE INVENTION

Figure 1:
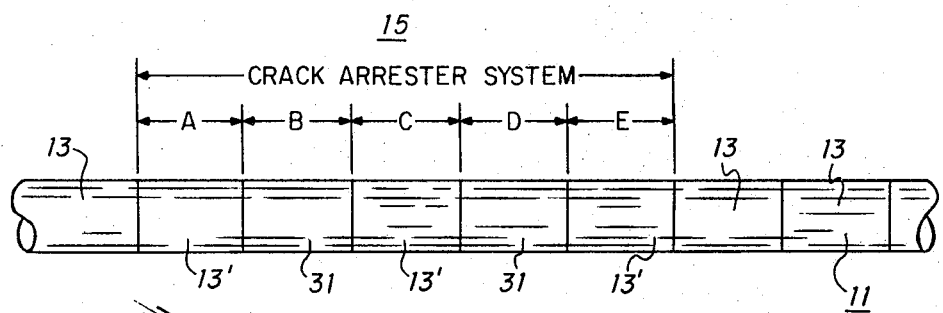
FIG. 1 represents a fragmented, schematic view of the multiple zone crack arrester system of this invention incorporated as a segment of a pipeline.

FIG. 1 of the drawing shows a pipeline 11 formed from a plurality of conventional pipe sections 13. Pipe sections 13 are placed in a longitudinal or an end-to-end pipeline fashion in open communication with one another and joined together by welding or other coupling means to provide the bulk of the pipeline. According to this invention, as will be shown, crack arrester system 15 is incorporated as a longitudinal segment of pipeline 11 at least one intermediate point between two sections of pipe 13 and between the ends of the pipeline.

As used herein, the term "longitudinal" refers to an axis or direction parallel to the length of the pipeline or a section thereof. For practical and comparative purposes, the term "longitudinal impact strength" is the impact strength determined by the Charpy V-Notch Impact Test which is fully and completely disclosed as ASTM Test E23-66, 1970 Annual Book of ASTM Standards, at pages 271 – 285. Regardless of the direction of major working or rolling of the metallic member, the length of the test specimen is taken in a circumferential direction to the pipeline, or, in other words, in a perpendicular direction to the longitudinal axis of the pipeline at a given point. The base of the notch is perpendicular to the surface of the pipe, and the depth of the notch is perpendicular to length of the test specimen.

Pipe sections 13 are typically formed from metal roll stock with the longitudinal axis of the pipe being parallel to the primary direction of rolling or major working of the metal. As a result, when pipe sections 13 are joined, the longitudinal axis of the pipeline is usually parallel to direction of rolling of each pipe section. As previously noted, pipelines formed in this manner are susceptible to a self-propagating longitudinal crack. The crack almost invariably travels along the top portion, e.g., in the uppermost portion sustending up to about 90°, of the pipeline. For this and other reasons, especially in colder regions, there is an increasing tendency toward more careful design of such pipelines. The design of a pipeline usually includes minimum specifications for the properties of the pipe. The design takes into consideration the various factors for predicting the relative resistance of sections of pipe to crack initiation and to subsequent crack propagation. Consideration is given to such factors as the operating temperature range, the rate of strain application, the stress level especially hoop stress, the pipe material especially chemical composition, and the presence of impurities, grain size, inclusion content, grain boundaries, heat treatment fabrication techniques, and the like. One of the better terms used to interrelate a number of relationships and measurements and describe the overall resistance of the pipe to failure is called toughness. Toughness is primarily a measurement of internal energy (e.g., foot-pounds) in the pipe at various temperatures. For practical purposes of this invention, crack propagation resistance is determined by hoop stress analyses and by measuring toughness. Toughness may be determined by the Charpy V-Notch Impact Test previously mentioned using various test specimens. Toughness relates to the tolerance of the pipe to flaws, to the ability of pipe to withstand impacts, to notch toughness, and the like. A good tough pipe will usually exhibit a higher internal energy level, that is, notch impact strength, over a greater temperature range and show a better defined safe operating temperature range than less tough pipes.

Figure 3:
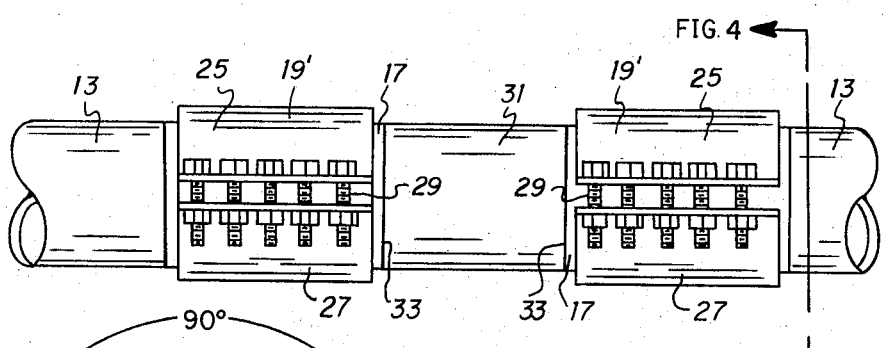
FIG. 3 is a fragmented, schematic view of the crack arrester system of this invention illustrating the application of a second member and a compressive force to increase the crack propagation resistance of two zones in a crack arrester system by decreasing the effective hoop stress in the pipeline, or increase the toughness of the two zones, or both.

The crack arrester system of this invention relates in part to the aforementioned pipeline considerations and the design of the sections of pipe. This arrester system has an internal diameter adapted for inline incorporation and open communication with sections of pipe 13 of pipeline 11. Crack arrester system 15 is comprised of at least three zones spaced along the longitudinal axis of the pipeline. For illustrative purposes only, in FIG. 1, the crack arrester system is shown as being comprised of five zones A, B, C, D and E. In FIG. 3, as will be hereafter described, only three zones are shown.

Figure 2:
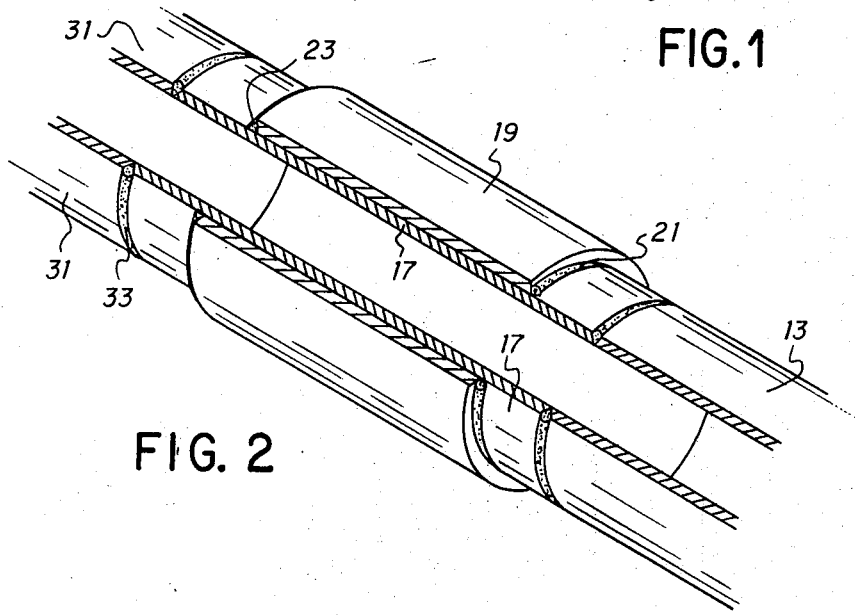
FIG. 2 is a fragmented, partially sectionized, schematic perspective of a zone wherein an extra distinct metallic member is used to increase the crack propagation resistance of a zone in a crack arrester system.

The crack arrester system is composed of alternating zones. In other words, a zone (e.g., A, C or E) higher in resistance to crack propagation than an intermediate zone precedes an intermediate, less resistant zone (e.g., B or D). In some instances in a well designed pipeline, the higher resistant may be sections 13' of pipeline 11; but in much prefered embodiments, higher resistant zones A, C or E are also more resistant to crack propagation than the two sections of pipe 13 on either side of the arrester system. The weaker intermediate zones are lower in resistance to crack propagation than the two sections of pipe 13 on either side of the arrester system. For reasons illustrated herein, it is important that the two zones at the two ends of the crack arrester system have a resistance to crack propagation at least as great as the pipeline sections and preferably higher in resistance to crack propagation than the two adjoining pipe sections. Crack arrester system 15 may be constructed in a number of ways and any number of parts or layers. For example, the higher resistant zones could be inline members like those described in U.S. Pat. Nos. 3,096,105 or 3,698,746. But in still more preferred embodiments, as illustrated in FIGS. 2 and 3, at least one of the higher resistant zones A, C or E is comprised at an inner layer 17 and at least one second member 19 contacting at least a portion of the outer surface of the inner layer. Two or more layers have a distinct advantage to increasing the zone's resistance to crack propagation or creating the shocks used in this invention. The resistances of each of the members or layers are more additive than in a monolithic member caused by the boundary between the two members or layers. The multiple layer or member system permits the combination of various impact strengths. Moreover, as will be shown, in arrangements using more than one member, one of the members may apply or create a significant counteracting axial compressive stress on the inner layer or layers.

In many of the embodiments of this invention wherein a higher resistant zone is comprised of at least two layers or members, inner layer 17 may be a cylindrical section with an internal diameter of approximately the same size as the section of pipe 13 connected to inner layer 17. The outside diameter of the inner layer may also be of approximately the same size as the pipe section. In further embodiments, the inner layer may be a section or partial section of pipe 13. The inner layer could also be a piece of pipe made of material of similar resistance to crack propagation as the resistance of the section of pipe 13 to which the higher resistant zone is joined, or it could be a piece of pipe having a longitudinal impact strength similar to the section of pipe to which the higher resistant zone is joined. If the crack arrester system has more than two higher resistant zones and the zone in question is an intermediate zone between the ends of the arrester system and is surrounded by weaker zones, the impact strength of the inner layer will usually be similar to the impact strength of both of the sections of the pipeline joined to each end of the crack arrester system.

Figure 4:
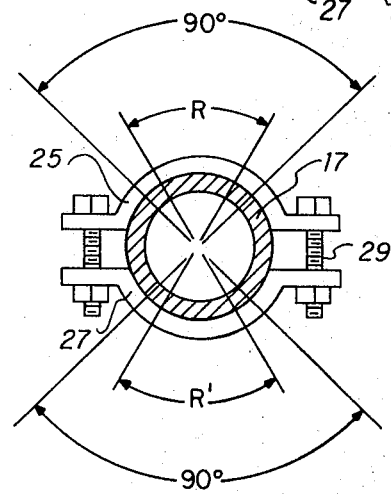
FIG. 4 is a sectionalized view taken at 4—4 on FIG. 3 and provides a schematic view illustrating the topmost and lowermost portions of the pipeline.

In the multiple layer or member embodiments, as especially shown in FIGS. 2 and 4, the second member contacts at least a portion of the longitudinal outer surface of inner layer 17. The amount of surface contact depends on the way in which the higher resistant zone is formed. In some embodiments of this invention for a higher resistant zone, the second member contacts at least a portion of the outer surface of the inner layer and creates a significant axial compressive stress in the inner member or pipe section thereby increasing the crack propagation resistance of the inner member or layer by reducing the effective hoop stress in the inner layer. In this latter embodiment, the second member will usually contact the inner layer at at least two points on opposite sides of the inner layer. In other arrangements, where the second member utilizes a different principle, the contact area or areas may be different. Since a crack usually propagates along the uppermost or top portion of a pipeline and since at a given point the second member may be designed both to reduce the hoop stress and to increase the overall fracture toughness or resistance of the pipe, second member 19 or 19' will usually be located in a manner such that it contacts inner layer 17 over at least the topmost radian of the outer surface of the inner layer. More preferably, the contact will be over at least the uppermost 90° of the circumference of the pipeline. In the embodiment involving the application of a compressive stress in the inner layer or pipe section, the second member will usually also contact at least the lowermost radian, or more preferably, at least the lowermost 90° of the circumference of the pipeline. The topmost radian is depicted by R in FIG. 4. There are $2\pi$ radians around the circumference of a cylinder; therefore, the topmost radian is an arc circumscribing the uppermost 57.3° of the cylindrical inner layer. The lowermost radian is depicted by R' in FIG. 4 and is an arc circumscribing the lowermost 57.3° of a cylindrical inner layer. The uppermost and lowermost 90° are also illustrated in FIG. 4. From a resistance and stress analysis or application point of view as well as from a crack path standpoint, it is preferred that the areas of contact be as large circumferentially as practical.

The multiple layer or member arrangement for a higher resistant zone is versatile, permits rapid assembly of the pipeline, and provides a practical system for creating the higher resistant zone using a combination of interacting resistances to crack propagation. A few examples of the versatility of the multiple layer or member arrangement using a cylindrically shaped inner layer or member, such as a piece or section of pipe (e.g., the pipe itself) are described below.

In a first example, the resistance of the inner layer is combined with the resistance of the second member surrounding the inner layer. As illustrated in FIG. 2, second member 19 is a cylindrically shaped layer or layers having two ends and surrounding or contacting at least a longitudinal portion of the outer surface of inner layer 17. As shown, the two ends of the second member may be at least partially or entirely circumferentially or radially welded at 21 and 23 to the outer surface of inner layer 17. The cylindrically shaped second member is formed of metal having a longitudinal impact strength greater than the longitudinal impact strength of the inner layer which it surrounds. The longitudinal impact strength of the second member may be increased in a number of ways, such as for example, the use of special metals, heat treating techniques, or fabrication techniques. For example, the second member may be a number of layers, or it may be a cylindrical member rolled in a different direction from the inner layer to increase its transverse impact strength. Normally, cylindrical members are rolled in the same or parallel direction as the length or longitudinal axis of the cylinder.

As a second example of the versatility of the multiple layer or member arrangement using the cylindrically shaped second member shown in FIG. 2, cylindrically shaped second member 19 has a normal internal diameter less than the outside diameter of cylindrically shaped inner layer 17. As a result, when the second member is placed around the inner layer and is allowed to shrink or contract, the shrinkage or contraction creates a positive and significant axial compressive stress on the inner layer or pipe section thereby increasing its crack propagation resistance by reducing the effective hoop stress in the inner layer. As previously mentioned, the two ends of the cylindrically shaped second member may be partially or entirely radially welded to the outer surface of inner layer 17.

In a third example, second member 19' of the versatile mutliple layer or member higher resistant zone is comprised of adjustable means adapted to cause the second member to create an axial compressive stress in inner layer 17. One way of providing an adjustable system of this nature is shown in FIGS. 3 and 4. As shown, second member 19' is comprised of first part 25 and second part 27. The two parts are located on opposite sides of inner layer 17 and each part contacts at least a portion of the longitudinal outer surface of the inner layer over at least one radian, and preferably over at least 90°. The two parts may be located in any relative position; but for reasons previously mentioned, it is preferred that they be located with one part contacting at least the uppermost radian, or more preferably the uppermost quadrant or 90°, of the inner layer and the other part contacting at least the lowermost radian, or more preferably the lowermost quadrant or 90°. As shown, the second member also includes adjustable means 29 for applying a force tending to pull the first and second parts toward each other to thereby create an axial compressive stress an inner layer 17. The adjustable means may be a series of bolts sufficient size, strength and number to permit the application of a force significant enough to create the axial compressive stress in the inner member.

The aforementioned three examples illustrate embodiments wherein different impact strength members or layers are combined or wherein the crack propagation resistance is increased by applying an axial compressive stress to an inner member. These two principles may be combined; that is, the second member may have both a different impact strength than the inner layer and apply an axial compressive stress to the inner layer. In other words, when a cylindrically shaped second member is used, it may have both an internal diameter smaller than the normal outer diameter of the cylindrically shaped inner layer and a longitudinal impact strength greater than the longitudinal impact strength of the inner layer. Also when the second member is comprised of at least two parts contacting the inner layer and includes means for pulling the two parts toward each other, the two parts may also be formed of metal of higher longitudinal impact strength than the inner layer.

As previously mentioned, the crack arrester system contains at least three zones. At least two of the zones are higher in resistance to crack propagation than an intermediate zone and, in the much preferred embodiments, are higher in resistance than the pipe used in the pipeline on either side of the arrester system. Thus, between each pair of zones of higher resistance is a zone (for example, B and D of FIG. 1) having a resistance to crack propagation lower than sections 13 of pipeline 11 on either side of crack arrester system 15. This weaker zone may be formed in a number of ways and may contain more than one weak area. This weaker zone is sufficiently strong to withstand the working hoop stress created by fluids in the pipeline and is sufficiently tough to prevent easy fracture initiation, but the weak zone is too weak to prevent normal fracture propagation. Moreover, it has a certain amount of brittleness and tends to fragment or break off. Normal pipeline sections 13 are usually high in toughness and upon crack propagation tend to split rather than fragment or break off. Preferably, if the higher resistant zones are pipe sections, the weaker less resistant intermediate zone will have a longitudinal impact strength equal to or less than eighty percent of the impact strength of the pipe sections.

As shown, the weak zones are inline tubular members 31 suitable for incorporation in the pipeline and connected on each end to a higher resistant zone by welds 33. Welds 33 may be designed to augment the rupture tendencies or characteristics of the weaker zones and the weak zone may be made up of several short tubular members or a single member.

As a safety precaution, since the less resistant zone is likely to be weaker in impact strength and easier to fracture initially, the weak zone will be marked or protected to lessen the chances of accidental external impacts.

During construction, a pipeline incorporating a crack arrester system of this invention may be formed by joining in an end-to-end fashion a plurality of pipe sections 13 which are in open communication with one another except where valves and other pipeline equipment are installed. The sections may be joined together by welding or other coupling methods.

At some point during construction of the pipeline, crack arrester system 15 is incorporated into the pipeline. More than one crack arrester system 15 can be employed along the length of the pipeline as desired and as depends upon the particular materials employed for the pipe sections, the arresters, the fluid carried by the pipeline, and the likelihood of a crack occurring.

Therefore, the number of individual arresters employed along a given pipeline can be one somewhere intermediate the ends of the pipeline, one or more between a pair of pipe sections as shown in FIG. 1, or any other number.

The crack arrester may be installed in the pipeline in several ways. In a well designed pipeline, a weaker less resistant section is placed between two more resistant pipe sections. But in the much preferred arrangements where at least three distinct zones different in crack propagation resistance than the pipe sections are used, the crack arrester system may be installed either by installing distinct zones, or by first constructing the crack arrester system and then joining it to sections of pipe in the pipeline, or by periodically installing an intermediate weak section and converting the adjoining pipe sections to higher resistant zones.

The much preferred crack arrester system is comprised of at least three distinctly different zones from the pipe. When such distinct zones are installed, the crack arrester system may be incorporated during pipeline construction by joining higher resistant zones to sections of the pipeline and joining the higher resistant zones to a weaker or less resistant zone. The actual construction sequence of steps may be varied to correspond to the relative length of the zones and the number of zones included in the arrester system. The sequence, however, involves, not necessarily in the order mentioned, joining section 13 of the pipeline 11 to one or a first end of a first zone that is at least in part more resistant to crack propagation than the section of pipe. The two are joined in a manner such that when joined, they form a communicating segment of the pipeline. The first higher resistant zone is joined at its other or second end to a zone that is at least in part less resistant to crack propagation than the pipe section to which the first zone is connected. The less resistant zone may be made up of one zone or of three or more zones alternating between being less resistant and more resistant than the adjoining pipe sections and ending in a less resistant zone. The reaction effects of the intermediate zone or zones would combine with the reaction effects of the other zones to cause the desired crack arresting effect.

In a similar fashion in much preferred system, a second zone that is at least in part more resistant to crack propagation than the pipe section to which it is connected is joined at one end to the less resistant or third zone and at the other end to a section of the pipe in the pipeline. When thus connected, all three zones form an inline communicating segment of the pipeline with the weaker zone being at least in part less resistant to crack propagation than both pipe sections and the higher resistant first and second zones.

The crack arrester systems of this invention can be composed of a number of parts or members of any suitable length even longer than a section of the pipe, and can be formed from any material which is now being formed into metal pipe or members. Such materials include steel, copper, stainless steel, and the like. A particularly useful material is steel which contains primarily (at least about 50 weight percent based on the total weight of the steel) ferrite with minor amounts (less than 50 weight percent based on the total weight of the steel) of austenite, martensite, and the like. The pipeline sections may also be composed of any suitable material for pipelines.

Reasonable variations and modifications are possible within the scope of this disclosure without departing from the spirit and scope of this invention.

The embodiments of the invention in which an exclusive property or privilege is claimed are defined as follows:

1. In a pipeline formed from a plurality of sections of pipe, at least one crack arrester system in said pipeline at at least one intermediate point between the ends of said pipeline, said crack arrester system being in open communication with sections of said pipeline and being comprised of at least three zones along the longitudinal axis of said pipeline, two of said zones being at the two ends of said crack arrester system and being joined to sections of said pipeline on either end of said crack arrester system, and at least one of said zones being between said two end zones and having a resistance to crack propagation lower than said two end zones and lower than said sections of said pipeline on either side of said crack arrester system.

2. The crack arrester system of claim 1 wherein the two end zones are sections of the pipeline having longitudinal impact strengths, and the at least one zone between said two end zones has a longitudinal impact strength at least as low as eighty percent of said longitudinal impact strengths of either of said two end zones.

3. The crack arrester system of claim 1 wherein the two end zones have a resistance to crack propagation higher than the resistance to crack propagation of the sections of the pipeline on either end of said crack arrester system.

4. The crack arrester system of claim 3 wherein at least one of the two higher resistant zones is comprised of at least an inner layer and a second member, said inner layer being a cylindrical section having a longitudinal outer surface, an outside diameter and an internal diameter, said internal diameter being of approximately the same size as the section of said pipeline connected to the higher resistant zone, and said second member contacting at least a portion of the longitudinal outer surface of said inner layer over at least the topmost radian of the outer surface of said inner layer.

5. The crack arrester system of claim 3 wherein the second member is a cylindrically shaped layer having two ends and an internal diameter of the same size as the outside diameter of the inner layer, and the two ends of said second member being at least partially welded to the outer surface of said inner layer.

6. The crack arrester system of claim 5 wherein said inner layer is a piece of pipe having a longitudinal impact strength similar to the section of the pipeline to which the higher resistant zone is joined, and said second member is formed of metal having a longitudinal impact strength greater than the longitudinal impact strength of said inner layer.

7. The crack arrester system of claim 3 wherein at least one of the two higher resistance zones is comprised of at least an inner layer and a second member, said inner layer being a cylindrical section having a longitudinal outer surface, an outside diameter and an internal diameter, said internal diameter being of approximately the same size as the section of said pipeline connected to the higher resistance zone, said second member contacting at least a portion of the longitudinal outer surface of said inner layer, and said second member creating a significant axial compressive stress in said inner layer.

8. The crack arrester system of claim 7 wherein said inner layer is comprised of a piece of pipe made of material of similar resistance to crack propagation as the resistance of the section of the pipeline to which the higher resistant zone is joined.

9. The crack arrester system of claim 7 wherein said second member is comprised of a cylindrically shaped metal member surrounding at least a portion of the longitudinal outer surface of said inner layer, and said cylindrically shaped metal member having two ends and normally having an internal diameter less than the outside diameter of said inner layer.

10. The crack arrester system of claim 9 wherein said inner layer is comprised of a piece of pipe made of material of similar resistance to crack propagation as the resistance of the section of the pipeline to which the higher resistant zone is joined.

11. The crack arrester system of claim 9 wherein the two ends of said cylindrically shaped metal member are at least partially welded to the outer surface of said inner layer.

12. The crack arrester system of claim 11 wherein said inner layer is comprised of a piece of pipe made of material of similar resistance to crack propagation as the resistance of the section of the pipeline to which the higher resistant zone is joined.

13. The crack arrester system of claim 9 wherein the cylindrically shaped metal member has a longitudinal impact strength greater than the longitudinal impact strength of said inner layer.

14. The crack arrester system of claim 13 wherein said inner layer is comprised of a piece of pipe made of material of similar resistance to crack propagation as the resistance of the section of the pipeline to which the higher resistant zone is joined.

15. The crack arrester system of claim 13 wherein the two ends of said cylindrically shaped metal member are at least partially welded to the outer surface of said inner layer.

16. The crack arrester system of claim 15 wherein said inner layer is comprised of a piece of pipe made of material of similar resistance to crack propagation as the resistance of the section of the pipeline to which the higher resistant zone is joined.

17. The crack arrester system of claim 7 wherein the second member includes adjustable means adapted to cause said second member to create the axial compressive stress in said inner layer.

18. The crack arrester system of claim 17 wherein said inner layer is a piece of pipe made of material of similar resistance to crack propagation as the resistance of the section of the pipeline to which the higher resistant zone is joined.

19. The crack arrester system of claim 7 wherein the second member contacts the longitudinal outer surface of said inner layer over at least a first radian and a second radian, said first radian and said second radian being located on opposite sides of said inner layer from each other, and the second member is comprised of a first part contacting said inner layer over at least said first radian, a second part contacting said inner layer over at least said second radian, and adjustable means for applying a force tending to pull said first part and said second part toward each other to thereby create an axial compressive stress in said inner layer.

20. The crack arrester system of claim 19 wherein said inner layer is a piece of pipe made of material of similar resistance to crack propagation as the resistance of the section of the pipeline to which the higher resistant zone is joined.

21. The crack arrester system of claim 19 wherein the first radian is the topmost radian of said inner layer and the second radian is the lowermost radian of said inner layer.

22. The crack arrester system of claim 21 wherein said inner layer is a piece of pipe made of material of similar resistance to crack propagation as the resistance of the section of the pipeline to which the higher resistant zone is joined.

23. The crack arrester system of claim 19 wherein the first part and the second part have a longitudinal impact strength greater than the longitudinal impact strength of said inner layer.

24. The crack arrester system of claim 23 wherein said inner layer is a piece of pipe made of material of similar resistance to crack propagation as the resistance of the section of the pipeline to which the higher resistant zone is joined.

25. In a method of constructing a pipeline formed of a plurality of sections of pipe joined in an end-to-end fashion in open communication with one another to provide said pipeline, the improvement comprising:
   a. joining one end of a first section of said pipe to a first end of a first zone which first zone is at least in part more resistant to crack propagation than said first section of said pipe, said first zone forming a segment of said pipeline;
   b. joining one end of a second section of said pipe to a first end of a second zone which second zone is at least in part more resistant to crack propagation than said second section of said pipe, said second zone forming a segment of said pipeline; and
   c. joining a first end of a third zone to the second end of said first zone and a second end of said third zone to the second end of said second zone, said third zone forming a segment of said pipeline and being at least in part less resistant to crack propagation than said first and second sections of said pipe.

26. The method of claim 25 wherein in step (c), the third zone is longitudinally formed of at least three zones with the two zones at each end of said third zone being at least in part less resistant to crack propagation than the first and second sections of said pipeline and with at least one intermediate zone between said two end zones being more resistant to crack propagation than said two end zones.

27. In a method of constructing a pipeline formed of a plurality of sections of pipe joined in an end-to-end fashion in open communnication with another to provide said pipeline, the improvement comprising:
   a. joining one of the ends of the first and second sections of said pipe to opposite ends of a zone forming a segment of said pipeline, said zone being at least in part less resistant to crack propagation than said first and second sections of said pipe; and
   b. increasing the crack propagation resistance of said first and said second sections of said pipe.

28. In the method of claim 27 wherein the crack propagation resistance of at least one of the first and second sections is increased by applying a significant axial compressive stress to at least a part of at least one of said first and second sections.

29. In the method of claim 27 wherein the crack propagation resistance of at least one of the first and second sections is increased by surrounding at least a part of at least one of said first and second sections with a metallic member having a longitudinal impact strength greater than the longitudinal impact strength of the section which said member surrounds.

* * * * *